(12) United States Patent
Tian et al.

(10) Patent No.: US 12,505,476 B2
(45) Date of Patent: Dec. 23, 2025

(54) SYSTEM AND METHOD FOR RAPID BIONIC ENTITY FITTING SAMPLING

(71) Applicant: WANGMO TECHNOLOGY (WUHAN) CO., LTD, Hubei (CN)

(72) Inventors: Lulu Tian, Hubei (CN); Li Tian, Hubei (CN); Zhaohui Ma, Hubei (CN); Ming Wu, Hubei (CN); Junyi Xu, Hubei (CN)

(73) Assignee: WANGMO TECHNOLOGY (WUHAN) CO., LTD, Hubei (CN)

( * ) Notice: Subject to any disclaimer, the term of this patent is extended or adjusted under 35 U.S.C. 154(b) by 0 days.

(21) Appl. No.: 19/172,565

(22) Filed: Apr. 7, 2025

(65) Prior Publication Data
US 2025/0238846 A1    Jul. 24, 2025

Related U.S. Application Data

(63) Continuation of application No. PCT/CN2022/132438, filed on Nov. 17, 2022.

(30) Foreign Application Priority Data

Oct. 27, 2022    (CN) .......................... 202211325932.4

(51) Int. Cl.
G06Q 30/00    (2023.01)
G06Q 30/0601    (2023.01)

(52) U.S. Cl.
CPC ..... *G06Q 30/0621* (2013.01); *G06Q 30/0643* (2013.01)

(58) Field of Classification Search
None
See application file for complete search history.

(56) References Cited

U.S. PATENT DOCUMENTS

| 9,696,130 B1* | 7/2017 | Eakins | ................... G01B 21/20 |
| 11,651,564 B2* | 5/2023 | Márquez | ................. G06T 19/00 |
| | | | 345/419 |

(Continued)

FOREIGN PATENT DOCUMENTS

| CN | 110570285 A | * 12/2019 | .............. B25J 11/00 |
| CN | 112083621 A | 12/2020 | |
| TW | 202038255 A | 10/2020 | |

OTHER PUBLICATIONS

Xu, H., Li, J., Weng, J., Deng, H., Zhou, C., Zhang, D. and Lu, G., The design of a deformable robotic mannequin, Dec. 2018, In 2018 IEEE International Conference on Robotics and Biomimetics (ROBIO), pp. 630-635. (Year: 2018).*

*Primary Examiner* — Kelly S. Campen
*Assistant Examiner* — Brittany E Bargeon

(57) ABSTRACT

A system for rapid bionic entity fitting sampling includes: a processing system; a fitting robot, a shooting component, and a server, all communicatively connected to the processing system; the processing system is configured to obtain a reservation order issued by a user, adjust a body shape of the fitting robot wearing a target garment according to the reservation order, so that the fitting robot wearing the target garment is in a target body shape, and control the shooting component to operate under the target body shape; the shooting component is configured to perform a 360-degree imaging of the fitting robot wearing the target garment to generate an image set corresponding to the target body shape; the processing system is further configured to upload all image sets corresponding to each target garment across all the target body shapes to the server for user access.

6 Claims, 1 Drawing Sheet

(56) References Cited

U.S. PATENT DOCUMENTS

2005/0258199 A1\* 11/2005 Honer ................... G09B 23/28
  223/66
2008/0262944 A1\* 10/2008 Wu ................... G06Q 30/0643
  705/27.2

\* cited by examiner

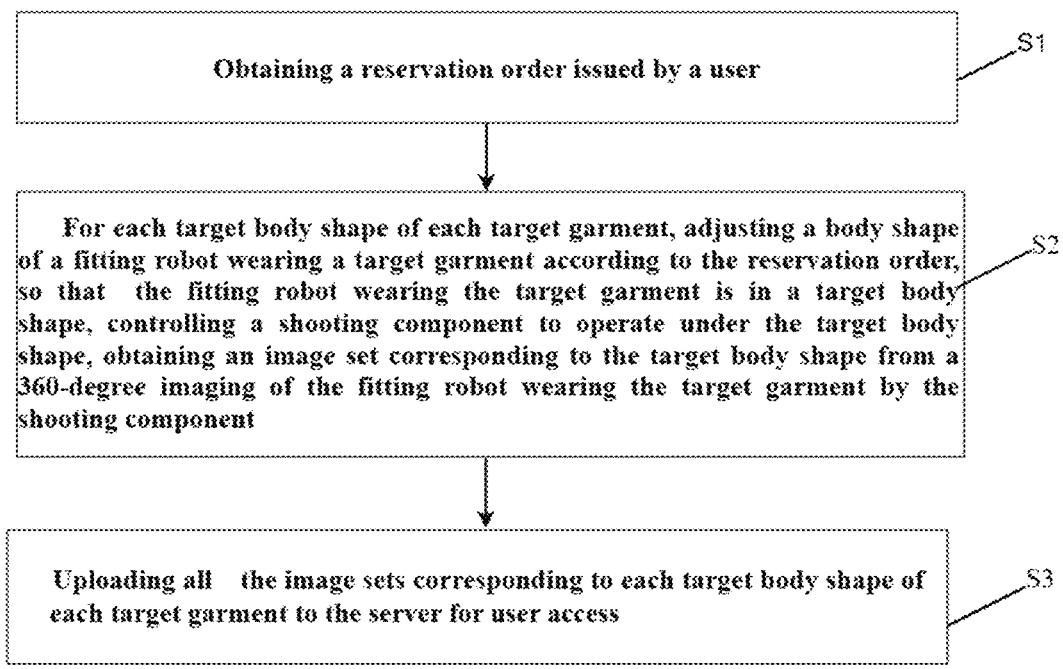

SYSTEM AND METHOD FOR RAPID BIONIC ENTITY FITTING SAMPLING

CROSS-REFERENCE TO RELATED APPLICATIONS

This application claims priority to Chinese patent application No. 202211325932.4, filed on Oct. 27, 2022, and International Patent Application No. PCT/CN2022/132438, filed on Nov. 17, 2022, both of which are hereby incorporated by reference in its entirety.

TECHNICAL FIELD

The present disclosure relates to the field of fitting sampling technology, and in particular to a system and method for rapid bionic entity fitting sampling.

BACKGROUND

Most customers have a success rate of less than 50% when shopping for garment online. This is due to their inability to accurately determine the size that fits them, which wastes both time and money. The resulting backlog of returns also causes losses for retailers. Utilizing online physical fitting methods can significantly improve the success rate of online garment purchases.

To achieve the effect of online physical fitting, current solutions can be categorized as follows:
  (1) Virtual Clothing: By editing fabric images and creating 3D models, fully digital synthesized garment models are provided. The advantages include rich animation effects, while the drawbacks are high production costs, slow processing times, low production capacity, average visual realism, and high promotion costs.
  (2) Magic Mirror Mapping: By organizing and editing single or multiple flat images, software is used to synthesize templates for garment patterns. The advantages are low technical difficulty and low cost, while the drawbacks include slow processing times, low visual realism, and low accuracy in body shape representation.
  (3) Live Model Shooting: Different body types of real models try on the same style, and photos or videos are taken for advertising the fitting effect, which can be replayed online. The advantages include high visual effects, while the drawbacks are limited body size data, high advertising production costs, and lengthy processes.

Based on this, there is an urgent need for a technology that can quickly and accurately achieve online physical fitting effects.

SUMMARY

The disclosed system and method can quickly complete the fitting and sampling processes of bionic entities, facilitating real-time online queries for bionic entity fitting images, with high accuracy in body shape representation.

According to an aspect of some embodiments of the present disclosure there is provided a system for rapid bionic entity fitting sampling, including: a processing system; a fitting robot, a shooting component, and a server, all communicatively connected to the processing system.

The processing system is configured to obtain a reservation order issued by a user, adjust a body shape of the fitting robot wearing a target garment according to the reservation order, so that the fitting robot wearing the target garment is in a target body shape, and control the shooting component to operate under the target body shape. The reservation order includes dressing images of each of multiple target garments on the fitting robot with different target body shapes.

The shooting component is configured to perform a 360-degree imaging of the fitting robot wearing the target garment to generate an image set corresponding to the target body shape.

The processing system is further configured to upload all image sets corresponding to each target garment across all the target body shapes to the server for user access.

The fitting robot includes driving components and a robot body. The driving components are mechanically coupled to the robot body. The processing system is configured to determine a motion parameter of each driving component based on the target body shape. The driving component is configured to move according to the motion parameter, drive the robot body to move, and position the fitting robot in the target body shape. Each driving component includes a motor.

The processing system is further configured to retrieve a pre-established body size database table based on a body size data of the target body shape to obtain a motor step length value corresponding to each motor in the fitting robot; wherein the motor step length value is calculated by:

$$H^*c = \left(\sqrt{q/p}\right)^* L + \sqrt{L^2 - \left(M - \sqrt{M^2 - q/p^* L^2}\right)^2}$$

Where H is a variable step length value of a single motor; c is a correlation constant; q is a Young's modulus of an outer elastic membrane material; p is a shear modulus of a soft rubber membrane; L is a dimensional cross-sectional perimeter variation; M is a median length of a force-bearing surface of the soft rubber membrane in dimensional cross-section; wherein substituting L, the variable step length value H of the motor is calculated to derive the motor step length value corresponding to the body size data.

The system encodes each image in the image set prior to uploading the image sets to the server. An image encoding includes a timestamp indicating imaging time parameters, a machine identification code, and an order code, enabling the server to perform a precise and rapid image searching. The machine identification code is an identification code of the fitting robot that completes a body shape deformation for the target garment, and the order code is a code of the reservation order associated with the image set.

The shooting component is configured to perform a 360-degree imaging of the fitting robot wearing the target garment from multiple angles; and The system is further configured to switch a fitting observation perspective of the target garment in response to a user input event on a terminal device during an image presentation.

In some embodiments, the system further includes a turntable. The turntable is communicatively connected to the processing system.

The fitting robot is fixedly mounted on the turntable.

The processing system is configured to control the turntable to rotate at a constant speed.

The shooting component is fixedly set. The shooting component is configured to capture continuous images of the fitting robot wearing the target garment to generate the image set corresponding to the target body shape.

In some embodiments, the system further includes a sensing component. The sensing component is mounted on the turntable and is communicatively connected to the processing system.

The sensing component is configured to detect a rotation angle of the turntable.

The processing system is further configured to:

Activate the shooting component when the fitting robot wearing the target garment achieves the target body shape and the turntable reaches a first preset angle; and Deactivate the shooting component when the fitting robot achieves the target body shape and the turntable reaches a second preset angle.

According to an aspect of some embodiments of the present disclosure there is provided a method for rapid bionic entity fitting sampling, implemented by the system, including:

Obtaining the reservation order issued by the user, wherein the reservation order includes the dressing images of each of the multiple target garments on the fitting robot with different target body shapes;

For each target body shape of each target garment, adjusting the body shape of the fitting robot wearing the target garment according to the reservation order, so that the fitting robot wearing the target garment is in the target body shape, controlling the shooting component to operate under the target body shape, obtaining the image set corresponding to the target body shape from the 360-degree imaging of the fitting robot wearing the target garment by the shooting component;

Uploading all the image sets corresponding to each target body shape of each target garment to the server for user access;

Prior to uploading, the method also includes: encoding each image in the image set. The image encoding includes the timestamp indicating the imaging time parameters, the machine identification code, and the order code;

Switching the fitting observation perspective of the target garment in response to the user input event on the terminal device during the image presentation.

In some embodiments, the obtaining the reservation order includes: obtaining the reservation order issued by the user by logging into a website and performing an online registration and reservation.

In some embodiments, after uploading all the image sets corresponding to each target body shape of each target garment to the server, the method further includes: responding to a user request to view the target garment, searching the server for all the image sets corresponding to the target body shape of the target garment, and transmitting the image sets to the user.

The present disclosure proposes a system and method for rapid bionic entity fitting sampling. The method includes obtaining the reservation order issued by the user, adjusting the body shape of the fitting robot wearing the target garment according to the reservation order, so that the fitting robot wearing the target garment is in a target body shape, controlling the shooting component to operate under the target body shape, obtaining the image set corresponding to the target body shape through surround shooting of the fitting robot wearing the target garment, and uploading all the image sets corresponding to each target body shape of each target garment to the server for user access. This enables the rapid completion of both the fitting and sampling processes of the bionic entity, allowing for real-time online queries of the fitting images. Furthermore, adjusting the fitting robot's body shape to different target body shapes results in high accuracy in the obtained images.

BRIEF DESCRIPTION OF DRAWINGS

To clarify the technical solutions of the embodiments of the present disclosure or prior art, the following is a brief introduction to the accompanying drawings that will be used in the description of the embodiments or prior art. It is evident that the drawings described below are merely some embodiments of the present disclosure, and that those skilled in the art can obtain other drawings based on these without inventive effort.

FIG. 1 is a schematic flow chart of a method for rapid bionic entity fitting sampling according to one or more embodiments of the present disclosure.

DETAILED DESCRIPTION OF THE EMBODIMENTS

The following will provide a clear and complete description of the technical solutions of the embodiments of the present disclosure. It is clear that the described embodiments are only part of the embodiments of the present disclosure, not all of them. All other embodiments obtained by those skilled in the art without inventive effort based on the embodiments of the present disclosure fall within the protection scope of the present disclosure.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the items listed.

Currently available online fitting methods, such as virtual clothing or magic mirror imaging, have high costs and low user experience, with excessive time required to generate fitting images, which do not significantly improve user satisfaction. Additionally, existing fitting robots developed by other institutions have not deeply participated in the garment sales market for various reasons. Although they can achieve bionic deformation, their design structures or motion mechanisms, along with high equipment costs, make them unsuitable for widespread promotion in the online garment industry.

Based on this, the present disclosure aims to leverage internet technology in conjunction with self-developed fitting robots to provide a service for real-time online queries of bionic entity fitting images in large volumes. Users can search for and view real images of garments on different body shapes using various mobile terminals, such as phones or computers, ensuring convenience, extremely low costs, and accuracy from data collection to terminal browsing.

Some embodiments of the present disclosure provide a system for rapid bionic entity fitting sampling, including: a processing system;

a fitting robot, a shooting component, and a server, all communicatively connected to the processing system.

The processing system is configured to obtain a reservation order issued by a user, adjust a body shape of the fitting robot wearing a target garment according to the reservation order, so that the fitting robot wearing the target garment is in a target body shape, and control the shooting component to operate under the target body shape. The reservation order includes dressing images of each of multiple target garments on the fitting robot with different target body shapes.

The shooting component is configured to perform a 360-degree imaging of the fitting robot wearing the target garment to generate an image set corresponding to the target body shape.

The processing system is further configured to upload all image sets corresponding to each target garment across all the target body shapes to the server for user access.

Specifically, the reservation order process may include: the user logging into the website via a mobile device or computer, registering online, and reserving the service content and time period for the fitting robot, resulting in a reservation order that the processing system directly obtains. Here, the service content is to capture images of the same garment on a single fitting robot presenting different body shapes, meaning that the reservation order includes capturing images of several target garments on fitting robots with different target body shapes. The target garments and their corresponding target body shapes relate directly, with one target garment corresponding to multiple target body shapes. It should be noted that in this embodiment, different sizes of the same style of garment are considered as multiple target garments. For example, if a certain style of garment comes in sizes S, M, and L, then the S size of that style counts as one target garment, the M size counts as another target garment, and the L size counts as yet another target garment.

In this embodiment, users can reserve the specific body size data needed for body shapes online, generating multiple target body shapes. The detailed body size data for the target body shapes is user-defined and generally falls within reasonable human data ranges. The body size data includes neck circumference, shoulder circumference, arm circumference, chest circumference, waist circumference, hip circumference, thigh circumference, upper body length, thigh length, and calf length, as well as other measurements, all of which can be freely adjusted on the fitting robot. Users can also reserve the number of required fitting robots online, i.e., the number of robots needed for trials.

In this embodiment, the fitting robot includes driving components and a robot body. The driving components are mechanically coupled to the robot body. The processing system is configured to determine a motion parameter of each driving component based on the target body shape. The driving component is configured to move according to the motion parameter, drive the robot body to move, and position the fitting robot in the target body shape.

Specifically, the fitting robot described in this embodiment is an intelligent device composed of driving components, a support frame, and bionic outer membranes. The support frame and the bionic outer membranes form the robot body. It comes in several models, each capable of mimicking various specific human forms, such as male models, female models, upper body models, lower body models, etc. The fitting robot includes a robot skeleton, a plurality of outer membranes set around the robot skeleton, and a driving component that drives one (or two) outer membranes to move. To achieve the movement of the multiple outer membranes, several driving components are needed, with each driving component including a motor and a screw rod. One end of the screw rod is connected to the motor drive, while the other end is connected to one (or two) outer membranes. The motor moves the screw rod, which in turn drives one (or two) outer membranes. Multiple motors control the movements of the outer membranes at different parts of the fitting robot independently, thereby allowing for the formation of different body shapes. The fitting robot in this embodiment uses a self-developed structure and motion design to accommodate the majority of common human body dimensions. The structure and motion methods of this fitting robot have been patented and will not be elaborated upon further here.

Based on the structure of the fitting robot mentioned above, adjusting the body shape of the fitting robot to achieve the target body shape can include: retrieving a pre-established body size database using user-specified body size data of the target body shape to obtain the motor step length values corresponding to each motor in the fitting robot. After the processing system confirms the matching set of step length values for the body shape, it issues a multi-motor synchronous operation instruction, allowing each motor to move to the specified step length value, thus enabling the fitting robot to display the user's desired target body shape within seconds.

The fitting robot in this embodiment is designed for bionic of the human body shape, focusing on accurately mimicking the various dimensional characteristic values of the human torso. The individual differences in human body shapes primarily lie in specific data differences in heights, shoulder widths, chest circumferences, waist circumferences, hip circumferences, etc. Here, height and shoulder width can be viewed as linear distance data differences (either horizontal or vertical), which exhibit a linear functional relationship within an effective range, so it can be adjusted by increasing or decreasing the number of specific steps of the corresponding motor. However, chest, waist, and hip circumferences are circular structures, necessitating the calculation of the circumference for each dimension. To achieve highly bionic and precise dimensional adjustments, this embodiment proposes the following scheme to calculate the step length values for motors corresponding to circular structures.

The structural characteristics of the achieved bionic form are as follows: the cross-section of the human torso closely resembles an ellipse, and the characteristic values of the ellipse (area, circumference, etc.) depend on the semi-major axis b and semi-minor axis a. In essence, different elliptical shapes can be adjusted by modifying the sizes of a and b. The fitting robot in this embodiment is designed based on the principle of independently adjusting the elliptical axes a and b using a cross-shaped multi-motor movement method. At each critical dimension cross-section of the torso, there are at least four motors that can be independently controlled. The motors adjust the lengths of the two segments of the a axis and the two segments of the b axis, facilitating changes in the lengths of the cross-sectional dimensions a and b. Theoretically, by increasing or decreasing the step lengths of the a and b axis motors based on the circumference formula characteristics of the ellipse, it is feasible to approximate different elliptical shapes, achieving relatively close elliptical circumference values. Occasionally, the three-dimensional cross-section of the human body faces inconsistencies in the front and back semi-arcs, and this design allows for separate control of the upper a axis and the lower a axis, achieving different lengths of the front and back semi-arcs (i.e., half circumferences) of the human body.

The principles and methods for accurately calculating bionic dimensional data in this embodiment's fitting robot utilize three layers of materials for the outer membrane, which include a hard component, a soft rubber component, and an elastic membrane component. These layers work together to maintain the continuity of the robot's outer membrane curve, preventing large gaps on the body surface of the robot due to the separation of membranes when motors increase their movement, thus avoiding distortion in the bionic effect. This outer membrane solution allows for a high degree of visual simulation, and the accuracy of its dimensional data can also be quantitatively calculated in relation to the corresponding motor step lengths. According to the static elastic potential energy formula, under any static state and within the effective elastic range, the force analysis on the robot's outer membrane indicates that the static elastic potential energy of the soft rubber membrane balances with that of the outermost elastic membrane, meaning they have equal elastic potential energies, expressed as follows:

$$\int_x^0 -kx\,dx = \frac{1}{2}kx^2$$

Where k is a material elastic coefficient, and x is a material deformation value of the material. The x value is in the interval of elastic deformation and is less than the plastic deformation value.

By analyzing the finite element forces for each dimensional plane, it can be seen that the deformation of the outermost elastic membrane is positively correlated with the deformation of the soft rubber membrane. For every dimensional cross-section, the total length of the elastic membrane corresponds to the cross-sectional perimeter, and the increase in the length of the elastic membrane within the dimensional plane is a positively correlated function of the step length value of that motor, as follows:

$$H^*c = \left(\sqrt{q/p}\right)^* L + \sqrt{L^2 - \left(M - \sqrt{M^2 - q/p^* L^2}\right)^2};$$

Or $$H^*c = \sqrt{L^2 - [M(1-\cos\theta)]^2} + M\sin\theta$$

$$\sin\theta = \left(\sqrt{q/p}\right)^* L/M;$$

Where H is a variable step length value of a single motor; c is a correlation constant; q is a Young's modulus of an outer elastic membrane material; p is a shear modulus of a soft rubber membrane; L is a dimensional cross-sectional perimeter variation; M is a median length of a force-bearing surface of the soft rubber membrane in dimensional cross-section. By substituting L into the equation, the variable step length value H of the motor is calculated. Based on the above principles, the step length values corresponding to each body size data can be calculated.

Based on the aforementioned principles for adjusting to the target body shape, the process of adjusting the fitting robot to multiple different target body shapes for each target garment includes: dressing the target garment on the fitting robot that matches the size, where the matching size refers to the variable body shape range of the fitting robot that completely covers the plurality of target body shapes corresponding to the target garment. According to the target body shape registered by the user, the pre-established body size database table is referenced to obtain the motor step length values of each motor for the target body shape, allowing multiple target body shapes to be converted into several sets of motor step length change schemes. Each set of motor step length change schemes includes the motor step length values of each motor under that target body shape. The complete set of motor step length change schemes is used as the operation instruction, implementing the length changes step by step as a complete unit. This way, the fitting robot can rhythmically transform into multiple target body shapes according to specified size requirements and size sequences, with each change representing a complete different target body shape.

In this embodiment, during the gap between the continuous deformations of two sets of target body shapes in the fitting robot, the shooting component is automatically controlled to perform 360-degree panoramic imaging of the robot wearing the target garment. Therefore, there is a preset interval time between adjacent target body shapes, which is greater than or equal to the time required for the shooting component to capture the image set of the target body shape, allowing for the adjustment to one target body shape, capturing and obtaining the image set of that target body shape, and then adjusting to the next target body shape until all the target body shapes have been adjusted, resulting in an image set for all the target body shapes of that the target garment.

In this embodiment, when obtaining the image set for each target body shape, the shooting component captures 360-degree surround images of the fitting robot in that target body shape wearing the target garment. The process for obtaining the image set can include: controlling the shooting component to rotate 360-degree around the fitting robot and continuously taking photos of the fitting robot during the rotation as per the shooting frame rate, thus generating the image set. At this time, the fitting robot can be placed on a fixed frame. Alternatively, the shooting component includes a ring of cameras set up around the fitting robot, allowing multiple cameras to simultaneously capture images of the fitting robot, resulting in the image set.

In some embodiments, the system further includes a turntable, which is communicatively connected to the processing system. The fitting robot is fixedly mounted on the turntable. The processing system is configured to control the turntable to rotate at a constant speed, causing the fitting robot fixed on the turntable to rotate along with it. The rotation driving method of the turntable is as follows: a motor drives a gear to rotate, which then drives the turntable. In this way, the motor on the turntable controls the gear transmission, allowing the robot to rotate horizontally at a constant speed in a standing position for 360-degree to enable the shooting component to continuously photograph the dressed robot. During this process, the shooting component is fixed in place and continuously captures images of the fitting robot wearing the target garment, resulting in an image set corresponding to the target body shape, thus completing the garment sampling process. By using the turntable, it is possible to achieve repeated 360-degree image sampling of the robot within the shortest time, the smallest spatial range, and the least amount of movement compared to other methods.

It should be noted that the turntable may be a Computer Numerical Control (CNC) electric turntable, and the shooting component may be a camera or an imaging sensor. The motor controlling the rotation of the turntable and the motor controlling the fitting robot for body shape transformation may both be stepper motors. The movement of the motor controlling the turntable and the motor controlling the fitting robot for body shape transformation operates independently and is controlled by the processing system. In this embodiment, the processing system may be integrated into a mainboard housed within the turntable.

In some embodiments, the system further includes a sensing component, the sensing component is mounted on the turntable and is communicatively connected to the processing system. There may be a plurality of sensor assemblies. The sensing component is configured to detect a rotation angle of the turntable and feedback the rotation angle data back to the processing system. Based on the rotation angle, the system can issue instructions for deformation and photography accordingly. When the turntable rotates and reaches a certain angle, it triggers the sensing component, which transmit a digital signal to the processing system. Once the processing system receives the signal, it makes a judgment and subsequently issues corresponding instructions to the shooting component, controlling it to start continuous shooting. When the turntable reaches another rotation angle, the sensing component is triggered again, the processing system makes another judgment, and issues an instruction to the shooting component to stop shooting, thus repeating this process.

Specifically, the processing system controls the shooting component to work when the fitting robot wearing the target garment is in the target body shape and the rotation angle of the turntable is at a first preset angle. When the fitting robot is still in the target body shape but the rotation angle of the turntable is at a second preset angle, the processing system controls the shooting component to stop working, while at the same time, it can control the fitting robot to adjust to the next target body shape. That is, after the shooting component completes the shooting process for the current target body shape, the processing system controls the fitting robot to adjust to the next target body shape.

In some embodiments, the sensing component is a Hall sensor. The system's operations achieve precision requirements at the sub-second (0.1-second) level. To ensure that the mechanical entity maintains stability in accuracy during operation in the real world, feedback control and corrections via this sensing component are essential.

In some embodiments, the shooting component is further configured to perform perform the 360-degree imaging of the fitting robot wearing the target garment from multiple angles. The "angle" refers to the inclination between the line connecting the shooting component and the fitting robot relative to the horizontal plane. One or more cameras or imaging sensors are used to capture multi-angle images or videos of the garment.

To ensure each image can be quickly and accurately searched and retrieved after being uploaded to the server, the system in some embodiments performs a secondary encoding on all sampled images before uploading the image set to the server, which may be a cloud server. Secondary encoding is meant to enable precise and rapid image searches on the server, but it does not edit the content of the images to maintain their authenticity.

Each target garment requires sampling across multiple target body shapes, with several 360-degree surrounding images for each target body shape. Therefore, the total number of images obtained from sampling each target garment is immense. The cloud server must group these massive numbers of images from a single sampling while correlating and calibrating them with the photographed target body shapes. However, in practice, the original names of multiple continuously captured images are numbered by shooting order, meaning images captured in the same second only have the shooting order number, making it impossible to group them. Additionally, when capturing images of the same object, the differences between two adjacent images are minimal, making it visually difficult to distinguish between them. It is impossible to differentiate the content of consecutively captured sets of images using computer graphic algorithms because the differences are too small, the data volume is too large, and the speed is too slow. Furthermore, manual classification is impractical due to the massive data volume, which does not align with this system's principles of "high speed" and "automation." Therefore, the main purpose of this encoding is to quickly and accurately differentiate all images captured in a single sampling through automated programming.

Some embodiments employ the following method for batch processing encoding: the system's shooting component is a digital camera that reads the image attribute files and extracts imaging time parameters, which act as timestamps with temporal sequences. The system batch reads the attribute files of each image to obtain the timestamps, using the continuity of the timestamps as one of the reference conditions for identifying each image, along with the current machine identification code (each fitting robot has a unique machine ID) and the order code (which is unique and provided by the system based on the reservation order). These different encoding data points form each image's traceable uniqueness label, meaning that the encoding for each image includes the timestamp indicating the imaging time parameters, the machine identification code, and the order code. The order code is automatically generated by the system when creating a reservation order, with each reservation order assigned a unique order code. The machine identification code records which fitting robot was used for the body shape transformation of the target garment, and this identification corresponds to the obtained images. These multiple encodings are combined into a long coding format that replaces the original filename of each image. After the images are uploaded to the cloud database, the long coding combination serves as a key index for associating images with orders. The system uses the order code and the execution time of the reserved body size data (i.e., the timestamp) as search pairing tags, enabling the location of the corresponding image set for retrieval, thus guaranteeing search accuracy and improving search efficiency.

This system in some embodiments also involves related physical hardware or equipment. Aside from the mobile terminals such as phones or computers, servers, fitting robots, turntables, and shooting components mentioned above, it can also include lighting, backgrounds, power cables, and signal cables. The lighting refers to common professional lighting equipment (such as fill lights) necessary for taking the image set of the target body shapes. The background refers to a completely blank or solid-color background necessary for capturing the image set. Power cables are used to supply power to devices like fitting robots, turntables, and shooting components, while signal cables are used for communication between different devices that require connectivity.

Based on the system setup mentioned above, some embodiments provide a specific application scenario and outlines the working process of the system within that scenario.

First, let's clarify the roles of each participant in this application scenario:

Role A: The clothing seller, referring to business operators who wish to sell garments through online or physical stores and have the authority to decide on the production and publication of advertisements for the items for sale.

Role B: The studio, referring to the specific offline venue providing fitting robot services and the staff within that venue.

Role C: The network programs and computer-side software unique to this system, which are non-physical components and part of the system's processing system.

Role D: The browsing inquirer, referring to individuals who search for garment images through Role C's network data, including garment consumers or potential consumers.

The working process of the system in some embodiments includes:

Step 1: Order Reservation Process. Role A logs onto Role B's website via a mobile or computer terminal to register online and make a reservation for the fitting robot service, specifying the service content and time slot. The service content refers to capturing real-world images of the same garment on a fitting robot in different body shapes. Role A can also reserve specific body data details and the number of body shapes online.

Step 2: Garment Sampling Delivery Process. Before the scheduled service time, Role A delivers the physical garments to be photographed to Role B. During the scheduled time slot, the staff at Role B will dress the fitting robot in the garment that corresponds to the predefined body data.

Step 3: Garment Sampling Process. Role C automatically controls the fitting robot through computer programs, changing to different complete body shapes according to the specified size requirements and sequence. Between two adjacent body shape transformations, the shooting component performs 360-degree panoramic imaging of the garment on the fitting robot.

Step 4: Process After Garment Sampling Completion. After completing all scheduled body shape sampling and shooting, Role A retrieves the photographed garment, and Role B uploads all sampled shooting image data to Role C's cloud server after secondary encoding. The secondary encoding is intended to enable Role C's cloud server to quickly and accurately conduct image searches, but does not edit the image content to maintain authenticity.

Step 5: A uses a mobile or computer terminal to link the image collection on Role C's cloud server to their online store or shares the image set with specific audiences as part of their regular promotional activities.

Step 6: Role D accesses the network Role C via a mobile or computer device, searches for the garment they need using standard feature tags, and views real-world images of the same garment on different body sizes, allowing for informed purchase decisions in online shopping.

The system provided in some embodiments integrates the internet, cloud servers, intelligent machinery, photography equipment, computers, and mobile devices to collaboratively complete the process of anthropomorphic fitting and sampling. It addresses the challenges of virtual fitting in online shopping. Role A only needs to place an order online and deliver the garments to Role B, while the sampling and subsequent processes are largely automated by the software and hardware systems. The entire sampling process takes only a few minutes, and within 1-2 hours (under normal network bandwidth conditions), Role D can consult various panoramic images of different body shapes online. This solution enables the rapid sampling of dozens or even hundreds of body type images in just a few minutes, with high accuracy and clear images. Compared to producing a large number of physical garment models (each with different body size data) and trying them on individually to capture panoramic photos, which would then need to be organized and published, while achieving the same sampling effects and image quality, this approach significantly reduces both labor costs and material expenses.

Some embodiments of the present disclosure provide a method for rapid bionic entity fitting sampling, as shown in FIG. 1, including:

S1. Obtaining a reservation order issued by a user, wherein the reservation order includes the dressing images of each of the multiple target garments on the fitting robot with different target body shapes.

The obtaining the reservation order includes: obtaining the reservation order issued by the user by logging into a website and performing an online registration and reservation.

S2. For each target body shape of each target garment, adjusting the body shape of the fitting robot wearing the target garment according to the reservation order, so that the fitting robot wearing the target garment is in a target body shape, controlling a shooting component to operate under the target body shape, obtaining an image set corresponding to the target body shape from a 360-degree imaging of the fitting robot wearing the target garment by the shooting component.

The adjusting the body shape of the fitting robot wearing the target garment according to the reservation order, so that the fitting robot wearing the target garment is in a target body shape, includes:

Determining the motion parameter of a driving component based on the target body shape in the reservation order;

Controlling the driving component to move according to the motion parameter to position the fitting robot in the target body shape.

S3: Uploading all the image sets corresponding to each target body shape of each target garment to the server for user access.

Prior to uploading, the method also includes: encoding each image in the image set, wherein the image encoding includes the timestamp indicating the imaging time parameters, the machine identification code, and the order code.

After uploading all the image sets corresponding to each target body shape of each target garment to the server, the method further includes:

Responding to a user request to view the target garment, searching the server for all image sets corresponding to the target body shape of the target garment, and transmitting the image sets to the user.

When displaying the target garment to the user, an interactive effect is provided on the terminal device that allows users to change the observation perspective of the fitting experience by finger swiping or rolling the wheel, thereby responding to input events on the terminal device to switch the observation perspective of the target garment. User input events include finger swipes and actions generated by rolling the wheel.

In this method, when displaying the target garment to the user, at least one image set of the target garment is already stored on the server, allowing users to observe every detail of the target garment remotely in 360-degree without dead angles. The presentation of the target garment to users adopts a virtual 3D interactive mode. Specific implementation details are as follows:

1) Perform a 360-degree surround imaging of the target garment to obtain an image set, with the number of images in the set being no less than eight. This can be 36 or 72 images, with the original resolution of the images not lower than 1920*1080, and possibly at 3840*2160. To reduce network transmission load and enhance user experience, the images are downscaled, with a resolution not exceeding 1920*1080, possible resolutions being 1280*720, before uploading to the server.

2) Display a low-resolution front image of the target garment to users and prompt them that they can change the observation angle via a touchscreen or other input devices for virtual 3D interaction, including controlling the rotation speed. Virtual 3D interaction can occur through swiping on touchscreen smartphones or tablets, touch-enabled smart TVs, or via mouse movements, mouse wheel scrolling, and keyboard keys. The terminologies for virtual 3D interaction may vary slightly across different platforms and operating systems, such as onTouchMove, onTouchEvent, onMouseScroll, onMouseMove, onKeyPress, onKeyDown, and this image switching technique for virtual 3D interaction is already known.

3) Through virtual 3D interaction, the switching of the image observation perspective is achieved. This image switching differs from traditional image switching on mobile devices; it is not a mere translation or fade of the images but an instant change to an entirely new image, where the switched images are required to follow an ordered sequence based on the shooting angle. In the method of some embodiments, the images used for switching are entirely captured by the shooting component, differing from the general 360-degree imaging and image storage of a single garment. In the process of capturing and generating these images within the hardware and software system of the entire method, more detailed information is synchronously recorded, including but not limited to: garment size information, model body size information, shooting angle information, and other related details. The rapid generation of this supplementary information for images can only be completed through the innovative collaborative implementation of this system.

4) Users can also be prompted to view high-definition images for each angle, with the prompt indicating that high-definition images will be downloaded only upon user request to save bandwidth.

Obviously, the described embodiments are only some embodiments of the present disclosure, not all embodiments. Any modifications, equivalent substitutions and improvements, etc., made within the spirit and principles of the present disclosure, all should be included in the protection scope of the present disclosure. Although the above embodiments provide a detailed description of the present disclosure, those skilled in the art can still, without conflicting, combine, add, or make other adjustments to the features of the embodiments of the present disclosure according to the circumstances, without exercising inventive labor, in order to obtain different technical solutions that are not depart from the essence of the present disclosure. These technical solutions also fall within the scope of protection of the present disclosure.

What is claimed is:

1. A system for rapid bionic entity fitting sampling, comprising:
a processing system;
a fitting robot, a shooting component, and a server, all communicatively connected to the processing system;
wherein the fitting robot comprises:
a robot skeleton;
a plurality of outer membranes arranged around the robot skeleton, wherein each outer membrane comprises a hard component, a soft rubber component, and an elastic membrane component; and
a plurality of driving components mechanically coupled to the plurality of outer membranes, wherein each driving component comprises a motor and a screw rod having a first end connected to the motor, and a second end connected to at least one of the plurality of outer membranes;
wherein the processing system is configured to:
obtain a reservation order issued by a user, wherein the reservation order comprises body size data defining a plurality of target body shapes to be simulated by the fitting robot for each of a plurality of target garments;
for each target body shape:
retrieve a pre-established body size database table based on a body size data of the target body shape to obtain a motor step length value corresponding to each motor in the fitting robot, wherein the motor step length value is calculated by:

$$H^*c = \left(\sqrt{q/p}\right)^* L + \sqrt{L^2 - \left(M - \sqrt{M^2 - q/p^* L^2}\right)^2}$$

where H is a variable step length value of a single motor; c is a correlation constant; q is a Young's modulus of an outer elastic membrane material; p is a shear modulus of a soft rubber membrane; L is a dimensional cross-sectional perimeter variation; M is a median length of a force-bearing surface of the soft rubber membrane in dimensional cross-section;
determine a motion parameter of each driving component based on the calculated motor step length value;
control the plurality of driving components to move according to their respective motion parameters to drive the outer membranes at different parts of the fitting robot to move independently, thereby positioning the fitting robot into the target body shape;
control the shooting component to perform a 360-degree imaging of the fitting robot wearing the target garment from a plurality of angles while the fitting robot is in the target body shape, thereby generating an image set corresponding to the target body shape;
encode each image in the image set, wherein an image encoding comprises;
a timestamp indicating imaging time parameters;
a machine identification code, wherein the machine identification code is an identification code of the fitting robot that completes a body shape deformation for the target garment; and
an order code, wherein the order code is a code of the reservation order associated with the encoded image set;
upload the encoded image set to the server for user access; and
switch a fitting observation perspective of the target garment in response to a user input event on a terminal device during an image presentation.

2. The system of claim 1, further comprising a turntable, wherein the turntable is communicatively connected to the processing system;
the fitting robot is fixedly mounted on the turntable;
the processing system is configured to control the turntable to rotate at a constant speed;

the shooting component is fixedly positioned, wherein the shooting component is configured to capture continuous images of the fitting robot wearing the target garment to generate the image set corresponding to the target body shape.

3. The system of claim 2, further comprising a sensing component, wherein the sensing component is mounted on the turntable and is communicatively connected to the processing system;
   wherein the sensing component is configured to detect a rotation angle of the turntable;
   wherein the processing system is further configured to:
   activate the shooting component when the fitting robot wearing the target garment achieves the target body shape and the turntable reaches a first preset angle; and
   deactivate the shooting component when the fitting robot achieves the target body shape and the turntable reaches a second preset angle.

4. A method for rapid bionic entity fitting sampling, implemented by the system of claim 1, comprising:
   obtaining the reservation order issued by the user, wherein the reservation order comprises the body size data defining the plurality of target body shapes to be simulated by the fitting robot for each of the plurality of target garments;
   for each target body shape of each target garment;
   adjusting the body shape of the fitting robot wearing the target garment according to the reservation order, so that the fitting robot wearing the target garment is in the target body shape;
   controlling the shooting component to operate while the fitting robot is in the target body shape;
   obtaining the image set corresponding to the target body shape from the 360-degree imaging of the fitting robot wearing the target garment by the shooting component;
   encoding each image in the image set, wherein the image encoding comprises the timestamp indicating the imaging time parameters, the machine identification code, and the order code;
   uploading all encoded image sets corresponding to all target body shapes for all target garments to the server for user access;
   switching the fitting observation perspective of the target garment in response to the user input event on the terminal device during the image presentation.

5. The method of claim 4, wherein the obtaining the reservation order issued by the user comprises:
   obtaining the reservation order issued by the user by logging into a website and performing an online registration and reservation.

6. The method of claim 4, wherein after uploading all the encoded image sets to the server, the method further comprises:
   responding to a user request to view the target garment, searching the server for all the encoded image sets corresponding to the target body shapes of the target garment, and transmitting the encoded image sets to the user.

* * * * *